United States Patent [19]

Fujiwara et al.

[11] Patent Number: 5,100,565
[45] Date of Patent: Mar. 31, 1992

[54] VALVE OF FAUCET

[75] Inventors: Norihito Fujiwara, Tajimi; Kouji Ogawa, Kasugai; Yoshihiro Yasunaga, Tajimi, all of Japan

[73] Assignee: Tokyo Yogyo Kabushiki Kaisha, Tokyo, Japan

[21] Appl. No.: 703,414

[22] Filed: May 21, 1991

[30] Foreign Application Priority Data

Jun. 29, 1990 [JP] Japan .................................. 2-173674

[51] Int. Cl.$^5$ ............................................. F16K 31/00
[52] U.S. Cl. ................................ 251/368; 137/625.17; 137/625.41
[58] Field of Search ................ 251/368, 309–312; 137/625.17, 625.41

[56] References Cited

U.S. PATENT DOCUMENTS

| 4,420,142 | 12/1983 | Dworak et al. | 137/625.41 |
| 4,856,758 | 8/1989 | Knapp | 137/625.41 |
| 4,935,313 | 6/1990 | Knapp et al. | 137/625.17 |
| 4,991,822 | 2/1991 | Enke | 251/368 |

FOREIGN PATENT DOCUMENTS

| WO86/04548 | 8/1986 | World Int. Prop. O. |
| WO87/02749 | 5/1987 | World Int. Prop. O. |
| WO88/04384 | 6/1988 | World Int. Prop. O. |
| WO89/04433 | 5/1989 | World Int. Prop. O. |

Primary Examiner—A. Michael Chambers
Attorney, Agent, or Firm—Frishauf, Holtz, Goodman & Woodward

[57] ABSTRACT

A valve of a faucet comprises a stationary disk and a rotary disk. Each of the stationary disk and the rotary disk is made of a ceramics or a metal, and one surface of the stationary disk and one surface of the rotary disk are in contact with each other to form a sliding face therebetween. The valve of the faucet opens and closes a passage of a liquid by means of a relative displacement of the stationary disk and the rotary disk along the sliding face to control the flow rate of the liquid. At least one of the one surface of the stationary disk and the one surface of the rotary disk, which form the sliding face, has a film substantially comprising diamond-like carbon thereon.

4 Claims, 8 Drawing Sheets

FIG. 5
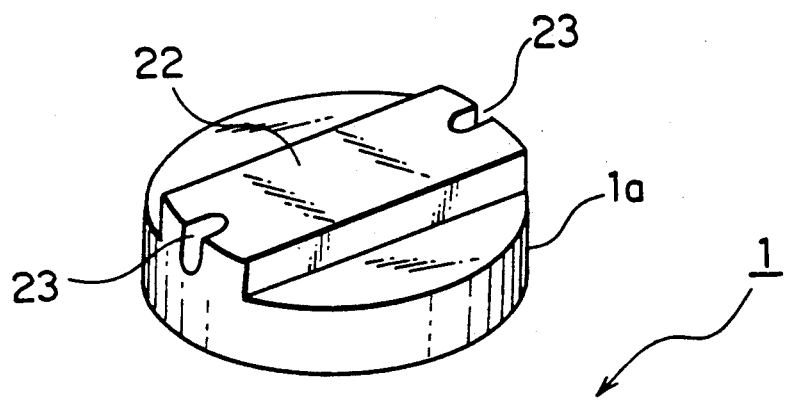
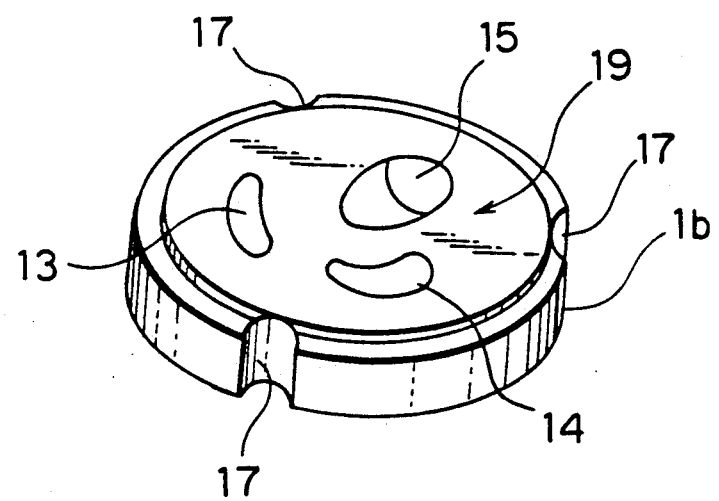
FIG. 6
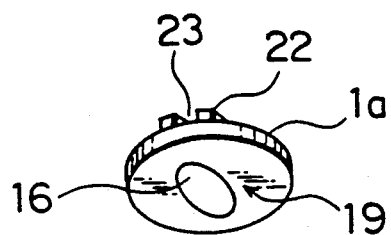

FIG. 8
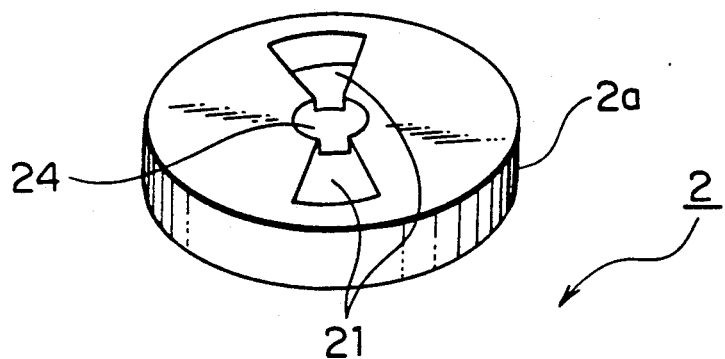
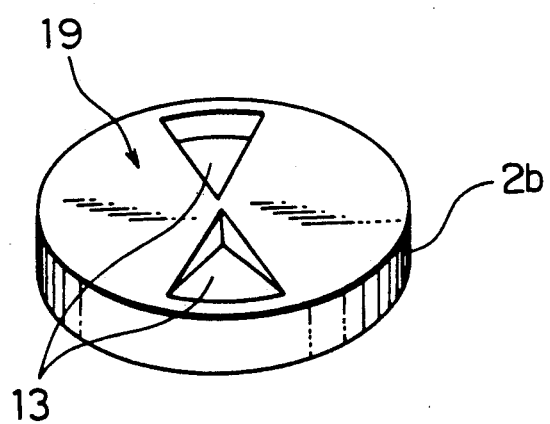

VALVE OF FAUCET

FIELD OF THE INVENTION

The present invention relates to a valve of a faucet.

BACKGROUND OF THE INVENTION

A valve of a faucet is incorporated in the faucet, and opens and closes a passage of a liquid such as cold or hot water to control the flow rate of the liquid.

A typical conventional valve of a faucet is described below with reference to the drawings.

FIG. 1 is an exploded perspective view illustrating a cold-hot water mixed type faucet in which a conventional valve of a faucet is incorporated; and FIG. 2 is a perspective view illustrating a rotary disk shown in FIG. 1.

As shown in FIGS. 1 and 2, the cold-hot water mixed type faucet a comprises a bottom lid 3; a valve of a faucet 1, which comprises a stationary disk 1b and a rotary disk 1a; a top lid 4; a lever 6; a face cover 5; and a cock 12. The disk-shaped bottom lid 3 is provided with a through-hole 7 for forming a passage allowing the inflow of cold water, a through-hole 8 for forming a passage allowing the inflow of hot water, and a through-hole 9 for forming a passage allowing the outflow of cold water and/or hot water. The lower opening of the through-hole 7 is provided with a duct 10 for the inflow of cold water, the lower opening of the through-hole 8 is provided with a duct 11 for the inflow of hot water, and the lower opening of the through-hole 9 is provided with a cock 12 for the outflow of cold water and/or hot water.

The stationary disk 1b is provided with a through-hole 13 for forming a passage allowing the inflow of cold water, a through-hole 14 for forming a passage allowing the inflow of hot water, and a through-hole 15 for forming a passage allowing the outflow of cold water and/or hot water. The respective lower openings of the through-holes 13, 14 and 15 of the stationary disk 1b have the same size as that of the respective upper openings of the through-holes 7, 8 and 9 of the bottom lid 3. The stationary disk 1b is water-tightly secured onto the upper surface of the bottom lid 3 so that the respective lower openings of the through-holes 13, 14 and 15 of the stationary disk 1b are aligned with the respective upper openings of the through-holes 7, 8 and 9 of the bottom lid 3. In FIG. 1, 18, 18 are packings arranged between the upper openings of the through-holes 7, 8 and 9 of the bottom lid 3, and the lower openings of the through-holes 13, 14 and 15 of the stationary disk 1b.

The diameter of the rotary disk 1a is slightly smaller than that of the stationary disk 1b. As shown in FIG. 2, the lower surface of the rotary disk 1a is provided with a groove 16 having prescribed shape and depth, for forming a passage of cold water and/or hot water. The rotary disk 1a is arranged in a water-tight so as to form the passage of cold water and/or hot water by means of the groove 16 on the lower surface of the rotary disk 1a, and the through-holes 13, 14 and 15 of the stationary disk 1b.

The lower inner peripheral surface of the top lid 4 is provided with a plurality of projections not shown matching with the shape of a plurality of recesses 17 provided on the side of the stationary disk 1b. The top lid 4 is stationarily secured to the upper surface of the bottom lid 3, and the projections of the top lid 4 engage with the respective recesses 17 of the stationary disk 1b.

The lever 6 comprises a vertical lever 6b and a horizontal lever 6a fixed at right angles to the upper end of the vertical lever 6b. The vertical lever 6b passes through the center portion of the top lid 4, and is connected to the top lid 4 via a movable pin not shown at the portion where the vertical lever 6b passes through the top lid 4. The lower end of the vertical lever 6b is connected to the upper surface of the rotary disk 1a via a pin not shown. In FIGS. 1 and 2, 22 and 23 are projections and recesses provided on the upper surface of the rotary disk 1a for connecting the lower end of the vertical ever 6b to the upper surface of the rotary disk 1a. The face cover 5 covers the stationary disk 1b, the rotary disk 1a, the top lid 4, and the vertical lever 6b, and is stationarily secured to the upper surface of the bottom lid 3.

By moving the horizontal lever 6a to the right or to the left, the rotary disk 1a rotates while sliding along the sliding face formed between the upper surface of the stationary disk 1b and the lower surface of the rotary disk 1a. Furthermore, by tilting the horizontal lever 6a upwardly or downwardly, the vertical lever 6b inclines, and the rotary disk 1a is pushed by the lower end of the vertical lever 6b, which has displaced by tilting. Thus, the rotary disk 1a displaces in the direction in which the rotary disk 1a is pushed by the lower end of the vertical lever 6b, while sliding along the sliding face.

Cold water flowing through the duct 10, the through-hole 7 of the bottom lid 3 and the through-hole 13 of the stationary disk 1b into the groove 16 provided on the lower surface of the rotary disk 1a, and hot water flowing through the duct 11, the through-hole 8 of the bottom lid 3 and the through-hole 14 of the stationary disk 1b into the groove 16, flow through the through-hole 15 of the stationary disk 1b and the through-hole 9 of the bottom lid 3 out from the cock 12. By displacing the rotary disk 1a through the operation of the lever 6, to cause the relative displacement of the stationary disk 1b and the rotary disk 1a along the sliding face, the passages for cold water and/or hot water are opened and closed, thus permitting control of the flow rate of cold water, hot water, and mixed cold and hot water.

Each of the rotary disk 1a and the stationary disk 1b is made of any one of a ceramics such as alumina, silicon carbide, silicon nitride, mullite and a mixture thereof, and a metal such as stainless steel and copper.

The lower surface of the rotary disk 1a and the upper surface of the stationary disk 1b, which are in a water-tight contact with each other to form the sliding face therebetween, are polished into smooth surfaces like a mirror. A lubricant such as silicone grease is present between the lower surface of the rotary disk 1a and the upper surface of the stationary disk 1b to improve lubricity of the sliding face.

Now, another conventional valve of a faucet is described below with reference to the drawing. FIG. 3 is an exploded perspective view illustrating a faucet exclusively for cold water or hot water, in which a conventional valve of a faucet is incorporated.

As shown in FIG. 3, the faucet B exclusively for cold water or hot water comprises a bottom lid 3; a valve of a faucet 2, which comprises a stationary disk 2b and a rotary disk 2a; a top lid 4; a lever 6; a face cover 5; and a cock 12. The disk-shaped bottom lid 3 is provided with a through-hole 7 for forming a passage allowing the inflow of cold or hot water. A duct 10 for the inflow of cold or hot water is fitted to the lower opening of the through-hole 7.

The stationary disk 2b is provided with a through-hole branched into two upper openings 13, for forming branched passages allowing the inflow of cold or hot water. The stationary disk 2b is water-tightly secured onto the upper surface of the bottom lid 3 so that the lower opening of the through-hole 13 of the stationary disk 2b is aligned with the upper opening of the through-hole 7 of the bottom lid 3. In FIG. 3, 20 is a packing arranged between the upper opening of the through-hole 7 of the bottom lid 3 and the lower opening of the through-hole 13 of the stationary disk 2b.

The rotary disk 2a is provided with two through-holes 21 of the same size as the two upper openings 13 of the through-hole of the stationary disk 2b. The rotary disk 2a is arranged in a water-tight contact with the upper surface of the stationary disk 2b so that the through-holes 21 of the rotary disk 2a and the through-holes 13 of the stationary disk 2b form passages for cold or hot water.

The top lid 4 is stationarily secured to the upper surface of the bottom lid 3, and the inner surface of the top lid 4 is in a firm contact with the peripheral edge of the stationary disk 2b. The cock 12 is fitted to the outside of the top lid 4. The lever 6 comprises a columnar vertical lever 6b and a horizontal lever 6a fixed at right angles to the upper end of the vertical lever 6b. The vertical lever 6b passes through the center portion of the top lid 4, and the lower end of the vertical lever 6b is fixed to a recess 24 provided at the center of the upper surface of the rotary disk 2a. The face cover 5 covers the stationary disk 2b, the rotary disk 2a, the top lid 4, and the vertical lever 6b, and is stationarily secured to the upper surface of the bottom lid 3.

By moving the horizontal lever 6a to the right or to the left, the rotary disk 2a rotates while sliding along the sliding face formed between the upper surface of the stationary disk 2b and the lower surface of the rotary disk 2a. Cold or hot water flowing through the duct 10, the through-hole 7 of the bottom lid 3, the through-holes 13 of the stationary disk 2b and the through-holes 21 of the rotary disk 2a into the top lid 4, flows out from the cock 12. By displacing the rotary disk 2a through the operation of the lever 6, to cause the relative displacement of the stationary disk 2b and the rotary disk 2a along the sliding face, the passage for cold or hot water is opened and closed, thus, permitting control of the flow rate of cold or hot water.

Each of the rotary disk 2a and the stationary disk 2b is made of any one of a ceramics such as alumina, silicon carbide, silicon nitride, mullite and a mixture thereof, and a metal such as stainless steel and copper.

The lower surface of the rotary disk 2a and the upper surface of the stationary disk 2b, which are in a water-tight contact with each other to form the sliding face therebetween, are polished into smooth surfaces like a mirror. A lubricant such as silicone grease is present between the lower surface of the rotary disk 2a and the upper surface of the stationary disk 2b to improve lubricity of the sliding face.

However, the above-mentioned conventional valves of the faucet 1 and 2 have the following problems:

In the above-mentioned conventional valves of the faucet 1 and 2, the sliding of the rotary disk along the sliding face formed between the lower surface of the rotary disk and the upper surface of the stationary disk, which are in a water-tight contact with each other, and a hydraulic pressure of cold water and/or hot water passing through the passages cause, with the lapse of time, gradual removal of a lubricant such as grease present between the lower surface of the rotary disk and the upper surface of the stationary disk. According as the lubricant decreases, a torque required for the sliding becomes larger, and finally, the rotary disk and the stationary disk adhere to each other, thus preventing the rotary disk from moving. This is referred to as the "adhesion phenomenon".

Under such circumstances, there is a demand for the development of a valve of a faucet, which comprises a stationary disk and a rotary disk, and permits a smooth sliding of the rotary disk along the sliding face formed between the upper surface of the stationary disk and the lower surface of the rotary disk without the need of a lubricant such as grease between the upper surface of the stationary disk and the lower surface of the rotary disk, and does not cause the adhesion phenomenon, but such a valve of a faucet has not as yet been proposed.

SUMMARY OF THE INVENTION

An object of the present invention is therefore to provide a valve of a faucet, which comprises a stationary disk and a rotary disk, and permits a smooth sliding of the rotary disk along the sliding face formed between the upper surface of the stationary disk and the lower surface of the rotary disk without the need of a lubricant such as grease between the upper surface of the stationary disk and the lower surface of the rotary disk, and does not cause the adhesion phenomenon.

In accordance with one of the features of the present invention, there is provided a valve of a faucet, which comprises a stationary disk and a rotary disk;

each of said stationary disk and said rotary disk being made of any one of a ceramics and a metal; one surface of said stationary disk and one surface of said rotary disk being in contact with each other to form a sliding face therebetween; and said valve of the faucet opening and closing a passage of a liquid by means of a relative displacement of said stationary disk and said rotary disk along said sliding face, to control the flow rate of said liquid; wherein:

at least one of said one surface of said stationary disk and said one surface of said rotary disk, which form said sliding face, has a film substantially comprising diamond-like carbon thereon.

BRIEF DESCRIPTION OF THE DRAWINGS

FIG. 5 is an exploded perspective view illustrating the valve of the faucet of the present invention shown in FIG. 4;

FIG. 6 is a perspective view illustrating a rotary disk of the valve of the faucet of the present invention shown in FIG. 5;

FIG. 8 is an exploded perspective view illustrating the valve of the faucet of the present invention shown in FIG. 7;

DETAILED DESCRIPTION OF PREFERRED EMBODIMENTS

From the above-mentioned point of view, extensive studies were carried out to develop a valve of a faucet, which comprises a stationary disk and a rotary disk, and permits a smooth sliding of the rotary disk, and does not cause the adhesion phenomenon over a long period of time.

As a result, the following findings were obtained: By forming a film comprising diamond-like carbon on at least one of the lower surface of the rotary disk and the upper surface of the stationary disk, which are in a water-tight contact with each other to form the sliding face therebetween, it is possible to hold a frictional force acting on the sliding face to a level of the. frictional force acting on the sliding face in the conventional valve of the faucet using the lubricant, and to improve wear resistance of the rotary disk and the stationary disk. It is therefore possible to obtain a valve of a faucet, which permits a smooth sliding of the rotary disk along the sliding face, and does not cause the adhesion phenomenon over a far longer period of time than before, without the need of a lubricant present between the lower surface of the rotary disk and the upper surface of the stationary disk.

The present invention was made on the basis of the above-mentioned findings. The valve of the faucet of the first embodiment of the present invention, which comprises a stationary disk and a rotary disk, is described below with reference to the drawings.

Figure 4:
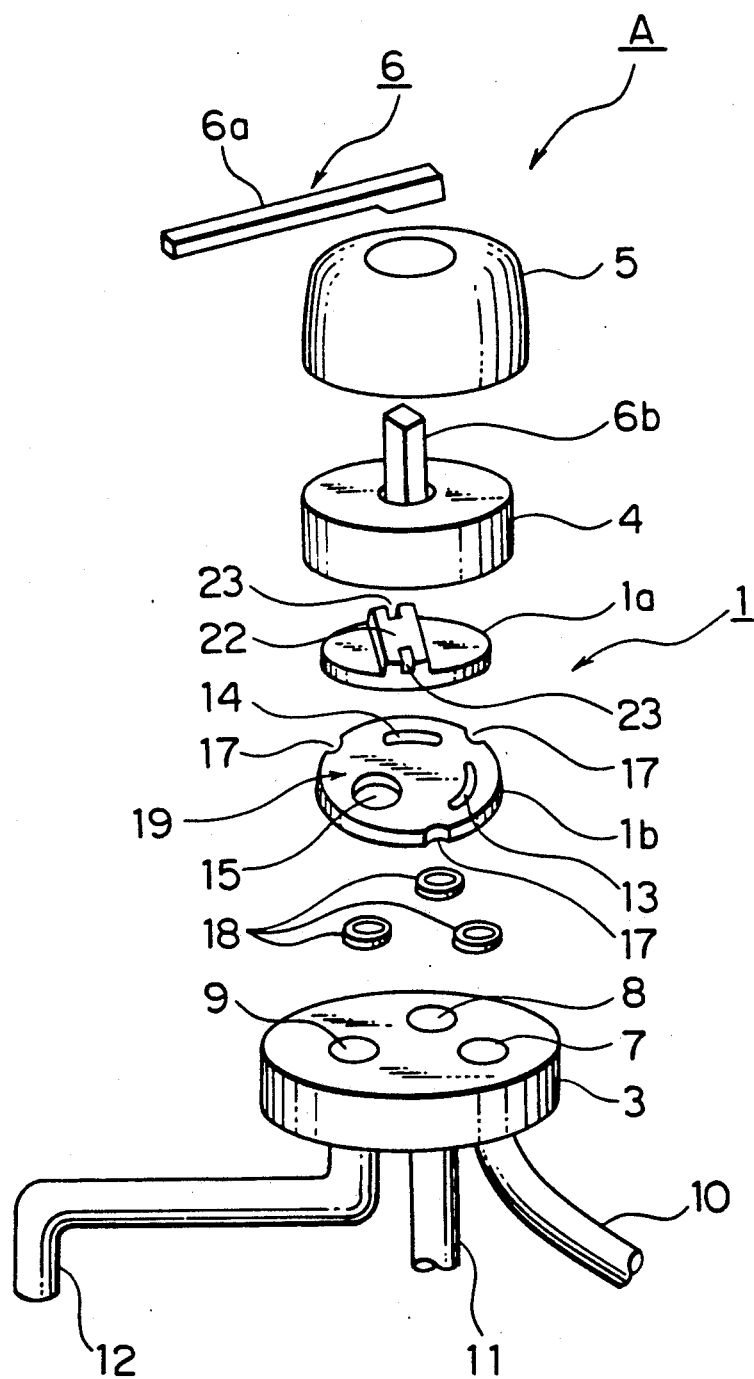
FIG. 4 is an exploded perspective view illustrating a cold-hot water mixed type faucet, in which a valve of a faucet of the first embodiment of the present invention is incorporated.

FIG. 4 is an exploded perspective view illustrating a cold-hot water mixed type faucet, in which a valve of a faucet of the first embodiment of the present invention is incorporated; FIG. 5 is an exploded perspective view illustrating the valve of the faucet of the present invention shown in FIG. 4; and FIG. 6 is a perspective view illustrating a rotary disk of the valve of the faucet of the present invention shown in FIG. 5.

Figure 1:
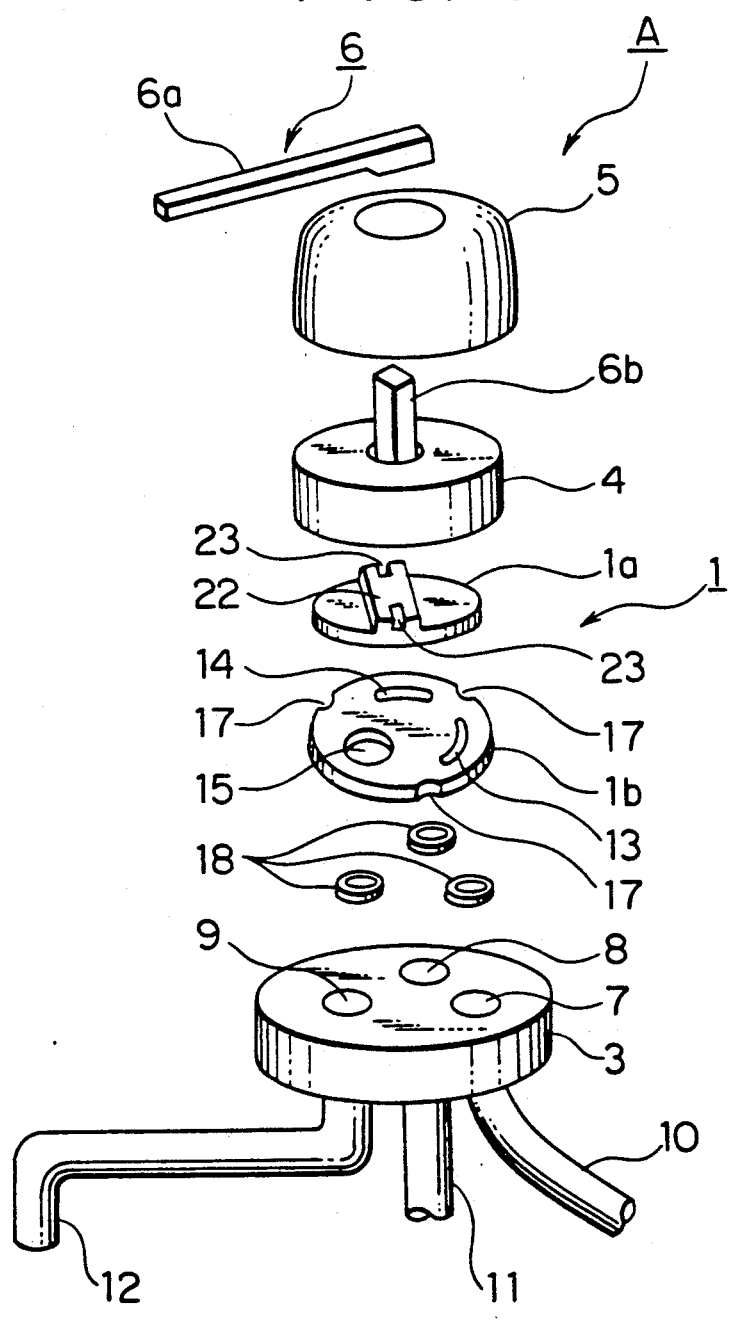
FIG. 1 is an exploded perspective view illustrating a cold-hot water mixed type faucet in which a conventional valve of a faucet is incorporated.
Figure 2:
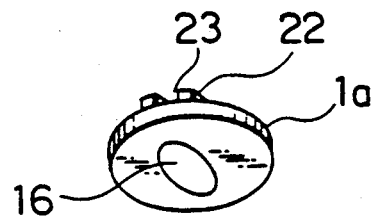
FIG. 2 is a perspective view illustrating a rotary disk shown in FIG. 1.

As shown in FIGS. 4, 5 and 6, the cold-hot water mixed type faucet A comprises a bottom lid 3; a valve of a faucet 1, which comprises a stationary disk 1b and a rotary disk 1a; a top lid 4; a lever 6; a face cover 5; and a cock 12. The cold-hot water mixed type faucet A shown in FIG. 4 is different from the conventional cold-hot water mixed type faucet A shown in FIG. 1 only in that the valve of the faucet 1 of the present invention is different from the conventional valve of the faucet 1, as described later.

Each of the stationary disk 1b and the rotary disk 1a, which form the valve of the faucet 1 of the present invention, is made of any one of a ceramics such as alumina, silicon carbide, silicon nitride, mullite and a mixture thereof, and a metal such as stainless steel and copper.

The lower surface of the rotary disk 1a and the upper surface of the stationary disk 1b, which are in a water-tight contact with each other to form the sliding face therebetween, are polished into smooth surfaces like a mirror. A film 19 comprising diamond-like carbon is formed on each of the lower surface of the rotary disk 1a and the upper surface of the stationary disk 1b.

Now, the film comprising diamond-like carbon used in the valve of the faucet 1 of the present invention is described.

Carbon displays polymorphism such as diamond-like carbon, diamond, amorphous carbon and graphite. Diamond-like carbon, popularly known as i-carbon, has properties distinctly different from those of the other carbon. For example, diamond-like carbon has a chemical composition comprising carbon and hydrogen, with an amorphous structure. Diamond-like carbon has a micro-Vickers hardness of from 1,000 to 5,000, which is higher than those of amorphous carbon and graphite. In terms of electrical properties, diamond-like carbon is an insulator, not having conductivity as amorphous carbon or graphite.

By forming the film 19 comprising diamond-like carbon having the properties as described above on the lower surface of the rotary disk 1a and the upper surface of the stationary disk 1b, which are in a water-tight contact with each other to form the sliding face therebetween, it is possible to hold a frictional force acting on the sliding face to a level of the frictional force acting on the sliding face in the conventional valve of the faucet using the lubricant, and to improve wear resistance of the rotary disk 1a and the stationary disk 1b The film comprising diamond-like carbon is formed on the lower surface of the rotary disk 1a and the upper surface of the stationary disk 1b mainly by means of a gas-phase synthesizing process such as CVD (abbreviation of Chemical Vapor Deposition) or PVD (abbreviation of Physical Vapor Deposition).

The film 19 comprising diamond-like carbon, formed on each of the lower surface of the rotary disk 1a and the upper surface of the stationary disk 1b, should have a thickness within a range of from 0.1 to 50 $\mu$m. With a thickness of the film 19 of under 0.1 $\mu$m, the sliding of the rotary disk 1a along the sliding face causes wear of the film 1a and easy wear-out thereof. With a thickness of the film 19 of over 50 $\mu$m, on the other hand, a shock exerted on the faucet and a sudden change in the water temperature cause the film 19 to peel off and finally come off. The film 19 comprising diamond-like carbon may be formed only on one of the lower surface of the rotary disk 1a and the upper surface of the stationary disk 1b.

Now, the valve of the faucet of the second embodiment of the present invention, which comprises a stationary disk and a rotary disk, is described below with reference to the drawings.

Figure 7:
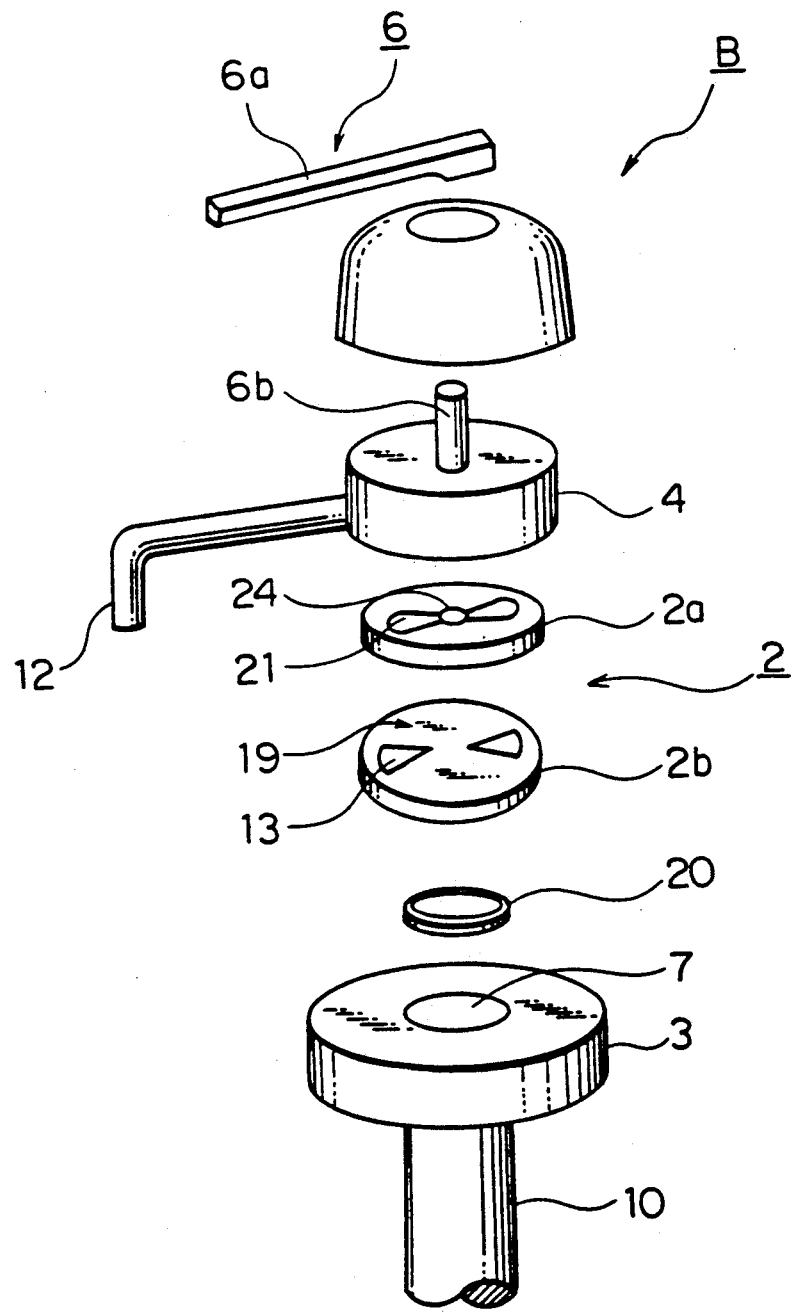
FIG. 7 is an exploded perspective view illustrating a faucet exclusively for cold water or hot water, in which a valve of a faucet of the second embodiment of the present invention is incorporated.

FIG. 7 is an exploded perspective view illustrating a faucet exclusively for cold water or hot water, in which a valve of a faucet of the second embodiment of the present invention is incorporated; and FIG. 8 is an exploded perspective view illustrating the valve of the faucet of the present invention shown in FIG. 7.

Figure 3:
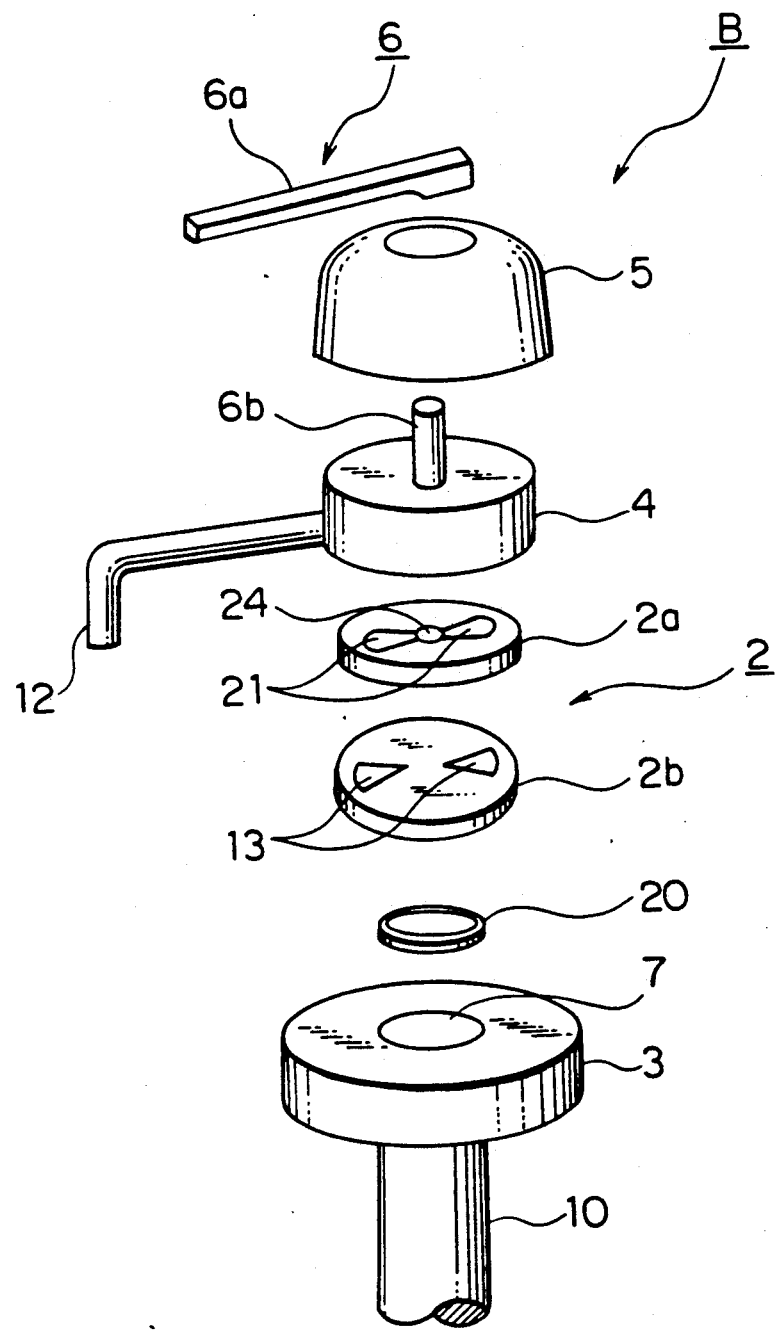
FIG. 3 is an exploded perspective view illustrating a faucet exclusively for cold water or hot water, in which a conventional valve of a faucet is incorporated.

As shown in FIGS. 7 and 8, the faucet B exclusively for cold water or hot water comprises a bottom lid 3; a valve of a faucet 2, which comprises a stationary disk 2b and a rotary disk 2a; a top lid 4; a lever 6; a face cover 5; and a cock 12. The faucet B exclusively for cold water of hot water shown in FIG. 7 is different from the conventional faucet B exclusively for cold water or hot water shown in FIG. 3 only in that the valve of the faucet 2 of the present invention is different from the conventional valve of the faucet 2, as described later.

Each of the stationary disk 2b and the rotary disk 2a, which form the valve of the faucet 2 of the present invention, is made of any one of a ceramics such as alumina, silicon carbide, silicon nitride, mullite an a mixture thereof, and a metal such as stainless steel and copper.

The lower surface of the rotary disk 2a and the upper surface of the stationary disk 2b, which are in a water-tight contact with each other to form the sliding face therebetween, are polished into smooth surfaces like a mirror. A film 19 comprising diamond-like carbon is formed on each of the lower surface of the rotary disk 2a and the upper surface of the stationary disk 2b.

In the valve of the faucet 2 of the second embodiment, the film 19 comprising diamond-like carbon, formed on each of the lower surface of the rotary disk 2a and the upper surface of the stationary disk 2b, should have a thickness within a range of from 0.1 to 50 $\mu$m, for the same reasons as described concerning the film 19 comprising diamond-like carbon used in the above-mentioned valve of faucet 1 of the first embodiment. The film 19 comprising diamond-like carbon may be formed only on one of the lower surface of the rotary disk 2a and the upper surface of the stationary disk 2b.

Now, the valve of the faucet of the present invention, which comprises the rotary disk and the stationary disk, is described further in detail by means of examples while comparing with examples for comparison.

EXAMPLE 1

Three sets of a valve of a faucet 1, comprising a rotary disk 1a and a stationary disk 1b and having a shape as shown in FIGS. 5 and 6, were prepared from a ceramics comprising 92 wt.% alumina($Al_2O_3$), 3 wt.% Silica ($SiO_2$), 3 wt.% magnesia(MgO), and 2 wt.% titanium oxide ($TiO_2$). Then, the lower surface of the rotary disk 1a and the upper surface of the stationary disk 1b of each valve of the faucet 1, were polished into a surface roughness expressed by a center-line mean roughness(Ra) of 0.08 $\mu$m as specified by the JIS Standard. In the valve of the faucet 1 of the first set, a film 19. comprising diamond-like carbon was formed on each of the lower surface of the rotary disk 1a and the upper surface of the stationary disk 1b to prepare a sample within the scope of the present invention (hereinafter referred to as the "sample of the invention") No. 1. In the valve of the faucet 1 of the second set, a film 19 comprising diamond-like carbon was formed only on the lower surface of the rotary disk 1a to prepare a sample within the scope of the present invention (hereinafter referred to as the "sample of the invention") No. 2.

The film 19 comprising diamond-like carbon was formed by means of the conventional microwave plasma CVD process, as follows.

More specifically, a target comprising metallic titanium(Ti), and the rotary disk 1a and/or the stationary disk 1b were placed in a vacuum vessel having a microwave plasma generator, and the pressure in the vacuum vessel was decreased to up to $10^{-5}$ Torr. Then, an argon gas and an acetylene gas were supplied into the vacuum vessel at a prescribed flow rate. Then, the microwave plasma generator was operated to cause the spattering of titanium (Ti) from the target and the decomposition of the acetylene gas, thereby to form a TiC film having a thickness of 0.1 $\mu$m on the lower surface of the rotary disk 1a and/or the upper surface of the stationary 1b. Then, the flow rate of the acetylene gas was increased, thereby to form a diamond-like carbon film 19 having a thickness of 5 $\mu$m on the TiC film. In the valve of the faucet 1 of the third set, the above-mentioned CVD process for the formation of the diamond-like carbon film was not carried out, and the valve of the faucet 1 of the third set, which did not have the diamond-like carbon film, was used as a sample outside the scope of the present invention (hereinafter referred to as the "sample for comparison") No. 1.

Each of the thus prepared samples of the invention Nos. 1 and 2 and the sample for comparison No. 1 was incorporated into the faucet A shown in FIG. 4. In the sample for comparison No. 1, silicone grease was provided between the lower surface of the rotary disk 1a and the upper surface of the stationary disk 1b. Then, a device for operating the lever 6 was attached to the faucet A to move the lever 6 to cause the sliding of the rotary disk 1a. More specifically, while continuously supplying cold water at a temperature of 20° C. and hot water at a temperature of 78° C. to the faucet A under a pressure of 3 Kgf/$cm^2$, the lever 6 was moved to the hot water closing side, the hot water opening side, the cold water opening side, the cold water closing side, and then to the hot water closing side in this sequence, and the number of sliding runs of the rotary disk 1a was counted with this sequence as one run of sliding.

For every certain number of sliding runs of the rotary disk 1a, the torque required for moving the lever 6 from the hot water opening side to the cold water opening side so as to cause the sliding of the rotary disk 1a, and the occurrence of the adhesion phenomenon were investigated. The results of the investigation are illustrated in FIG. 9.

Figure 9:
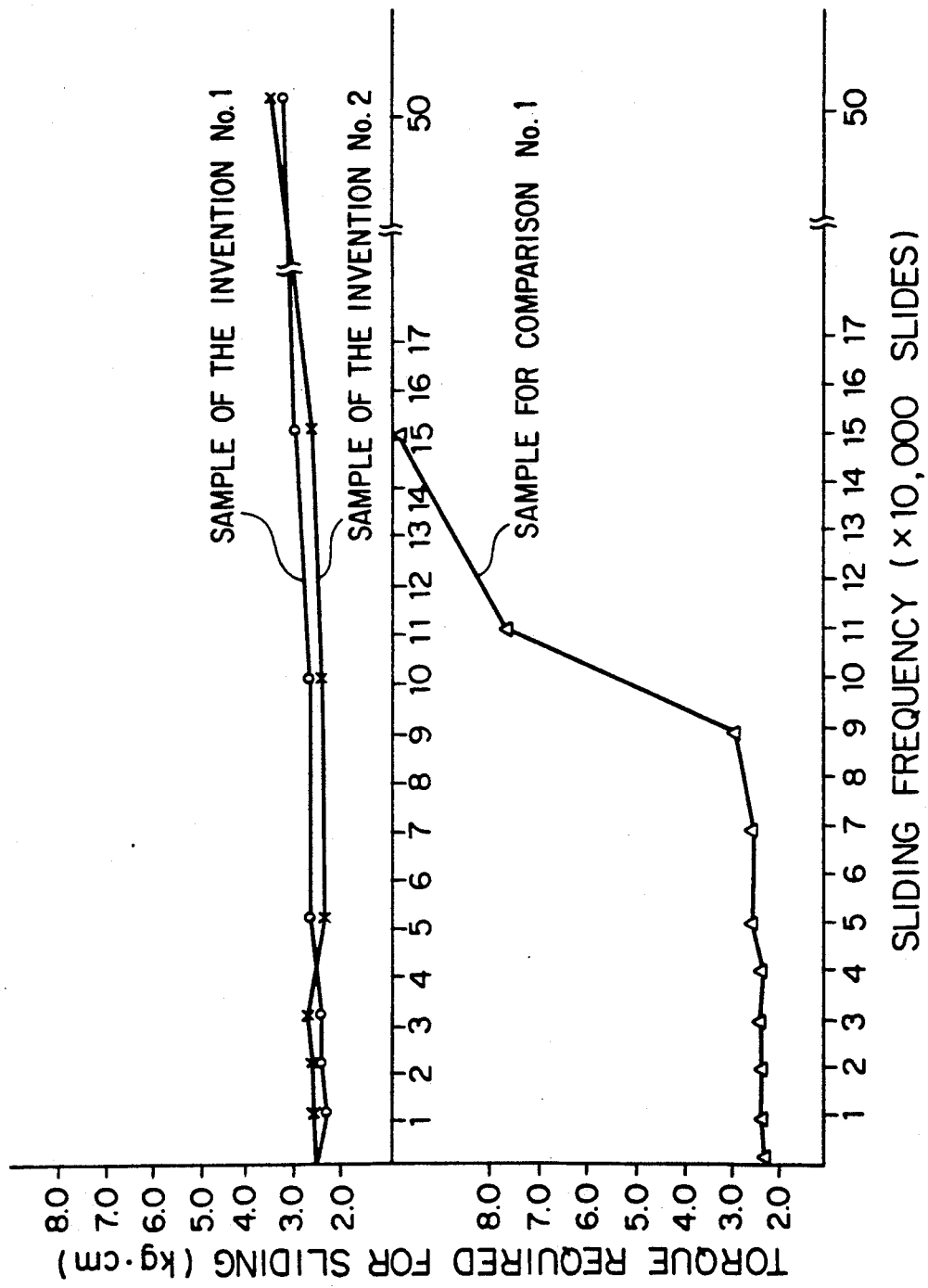
FIG. 9 is a graph illustrating the relationship between a sliding frequency and a torque required for the sliding of a valve of a faucet.

In FIG. 9, the abscissa represents the number of sliding runs of the rotary disk 1a, and the ordinate represents the torque required for the sliding. Also in FIG. 9, the mark "o" indicates the sample of the invention No. 1, the mark "x" indicates the sample of the invention No. 2, and the mark "$\Delta$" indicates the sample for comparison No. 1.

As is clear from FIG. 9, in the sample for comparison No. 1, the torque required for the sliding was under 3.0 Kg·cm before the number of sliding runs of 70,000 was reached. In the sample for comparison No. 1, however, the torque required for the sliding began to sharply increase and an abnormal sound caused by the friction between the rotary disk 1a and the stationary disk 1b was produced, when the number of sliding runs of 90,000 was reached. When the number of sliding runs of 110,000 was reached, the torque required for the sliding amounted to about four times as large as the initial torque.

In the samples of the invention Nos. 1 and 2, in contrast, the torque required for the sliding was under 3.0 Kg·cm in the initial stage of the sliding, and there was almost no change in the torque required for the sliding even when the number of sliding runs of 500,000 was reached. The thickness of the film 19 comprising diamond-like carbon of each of the samples of the invention Nos. 1 and 2 was measured when the number of sliding runs of 500,000 was reached. As a result, the film 19 of the sample of the invention No. 1 had a thickness of 4.5 $\mu$m, and the film 19 of the sample of the invention No. 2 had a thickness of 3 $\mu$m. This revealed that wear of the film 19 comprising diamond-like carbon was very slight. In the samples of the invention Nos. 1 and 2, there was produced no abnormal sound caused by the friction between the rotary disk 1a and the stationary disk 1b until the number of sliding runs of 500,000 was reached.

EXAMPLE 2

Two sets of a valve of a faucet 2, comprising a rotary disk 2a and a stationary disk 2b and having a shape as shown in FIG. 8, were prepared from the same ceramics as in the Example 1. Then, the lower surface of the rotary disk 2a and the upper surface of the stationary disk 2b of each valve of the faucet 2, were polished into a surface roughness expressed by a center-line mean roughness(Ra) of 0.1 µm as specified by the JIS Standard. In the valve of the faucet 2 of the first set, a film 19 comprising diamond-like carbon was formed on each of the lower surface of the rotary disk 2a and the upper surface of the stationary disk 2b to prepare a sample within the scope of the present invention (hereinafter referred to as the "sample of the invention") No. 3.

The film 19 comprising diamond-like carbon was formed by means of the conventional microwave plasma CVD process as in the Example 1, as follows.

More specifically, a target comprising metallic titanium(Ti), and the rotary disk 2a and the stationary disk 2b were placed in a vacuum vessel having a microwave plasma generator, and the pressure in the vacuum vessel was decreased to up to $10^{-5}$ Torr. Then, an argon gas, a nitrogen gas and an acetylene gas were supplied into the vacuum vessel at respectively prescribed flow rates. Then, the microwave plasma generator was operated to cause the spattering of titanium(Ti) from the target and the decomposition of the nitrogen gas, thereby to form a TiN film having a thickness of 0.1 µm on the lower surface of the rotary disk 2a and the upper surface of the stationary disk 2b. Then, the flow rate of the nitrogen gas was decreased and the flow rate of the acetylene gas was increased, thereby to form a TiC film having a thickness of 0.1 µm on the TiN film. Then, the flow rate of the nitrogen gas was extremely decreased and the flow rate of the acetylene gas was further increased, thereby to form a diamond-like carbon film having a thickness of 3 µm on the TiC film.

In the valve of the faucet 2 of the second set, the above-mentioned CVD process for the formation of the diamond-like carbon film was not carried out, and the valve of the faucet 2 of the second set, which did not have the diamond-like carbon film and was not applied with a lubricant such as silicone grease on the sliding face, was used as a sample outside the scope of the present invention (hereinafter referred to as the "sample for comparison") No. 2.

Each of the thus prepared sample of the present invention No. 3 and the sample for comparison No. 2 was incorporated into the faucet B shown in FIG. 7. Then, a device for operating the lever 6 was attached to the faucet B to move the lever 6 to cause the sliding of the rotary disk 2a. More specifically, while continuously supplying hot water at a temperature of 75° C. to the faucet B under a pressure of 0.6 Kgf/cm², the lever 6 was moved to the hot water opening side, the hot-water closing side and then to the hot water opening side in this sequence, and the number of sliding runs of the rotary disk 2a was counted with this sequence as one run of sliding.

For every certain number of sliding runs of the rotary disk 2a, the torque required for moving the lever 6 from the hot water closing side to the hot water opening side so as to cause the sliding of the rotary disk 2a, and the occurrence of the adhesion phenomenon were investigated. The results of the investigation are illustrated in FIG. 10.

Furthermore, after measuring the above-mentioned torque required for the sliding of the rotary disk 2a at a certain number of sliding runs, the lever 6 was stopped at the hot water closing side. Then, after the lapse of one hour, the sliding of the rotary disk 2a was resumed, and the torque required for the resumption of sliding of the rotary disk 2a. The difference in torque required for the sliding of the rotary disk 2a between the moment of the stoppage of the sliding and the moment of the resumption of the sliding after the lapse of one hour, was investigated. The reason of this investigation was as follows: When the rotary disk is left in the non-sliding state, the frictional force acting on the sliding face between the rotary disk 2a and the stationary disk 2b increases along with the lapse of time, and it becomes gradually difficult to move the lever 6 so as to cause the sliding of the rotary disk 2a, thus leading to the occurrence of the adhesion phenomenon. The results of the above-mentioned investigation are also illustrated in FIG. 10.

Figure 10:
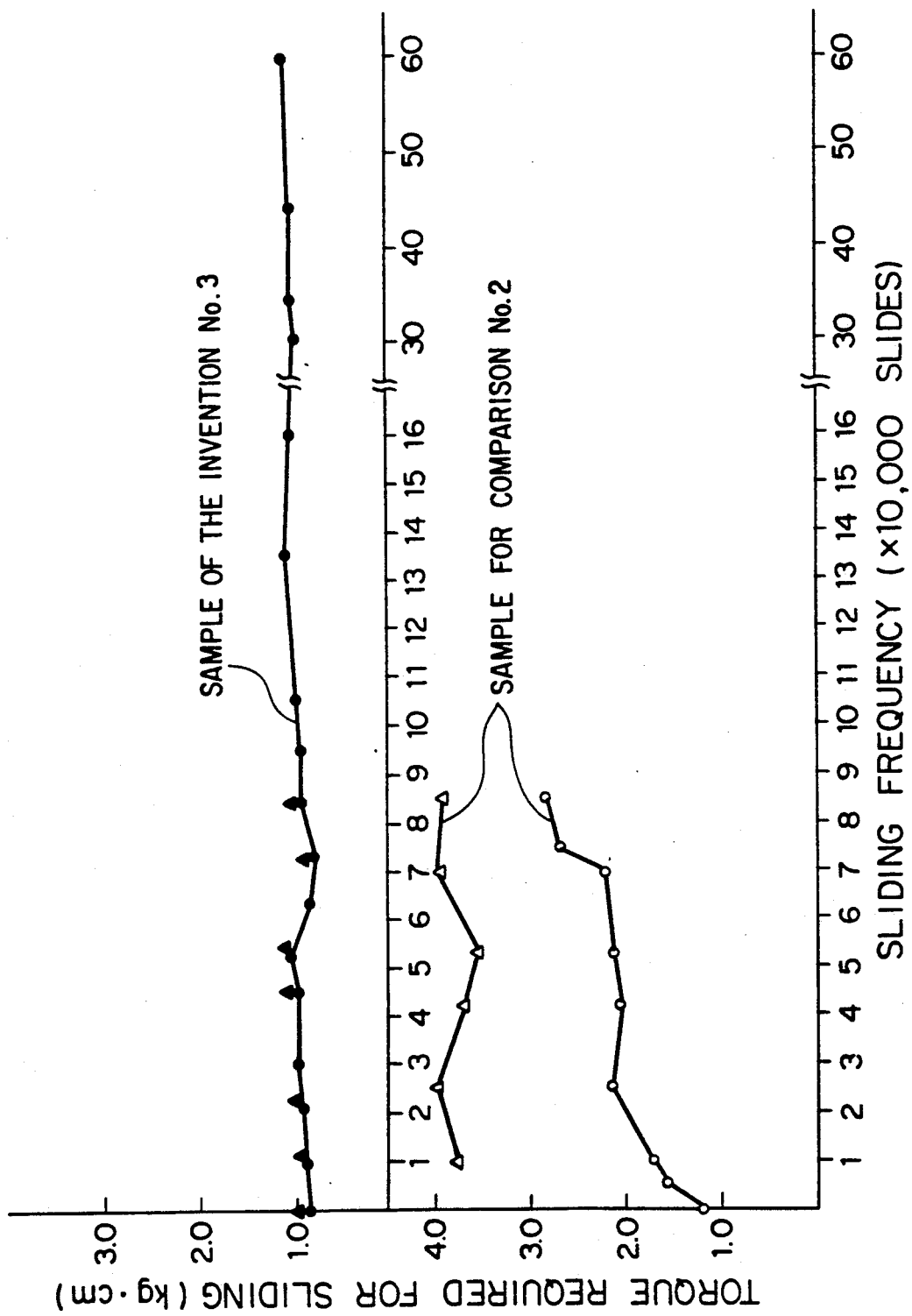
FIG. 10 is another graph illustrating the relationship between a sliding frequency and a torque required for the sliding of a valve of a faucet.

In FIG. 10, the abscissa represents the number of sliding runs of the rotary disk 2a, and the ordinate represents the torque required for the sliding. Also in FIG. 10, the mark "●" indicates the sample of the invention No. 3 at the moment of the stoppage of the sliding, the mark "▲" indicates the sample of the invention No. 3 at the moment of the resumption of the sliding after the lapse of one hour, the mark "o" indicates the sample for comparison No. 2 at the moment of the stoppage of the sliding, and the mark "Δ" indicates the sample for comparison No. 2 at the moment of the resumption of the sliding after the lapse of one hour.

As is clear from FIG. 10, in the sample for comparison No. 2, the torque required for the sliding increased suddenly in a short period of time. In addition, there was observed a very large difference in torque required for the sliding between the moment of the stoppage of the sliding and the moment of the resumption of the sliding after the lapse of one hour. In the sample for comparison No. 2, an abnormal sound caused by the friction between the rotary disk 2a and the stationary disk 2b was produced when the number of sliding runs of 5,000 was reached.

In the sample of the invention No. 3, in contrast, the torque required for the sliding was under 1.0 Kg-cm in the initial stage of the sliding, and there was almost no change in the torque required for the sliding even when the number of sliding runs of 600,000 was reached. In addition, in the sample of the invention No. 3, there was almost no difference in torque required for the sliding between the moment of the stoppage of the sliding and the moment of the resumption of the sliding after the lapse of one hour. In the sample of the invention No. 3, there was produced no abnormal sound caused by the friction between the rotary disk 2a and the stationary disk 2b until the number of sliding runs of 600,000 was reached.

According to the present invention, as described above in detail, it is possible to obtain a valve of a faucet, which comprises a stationary disk and a rotary disk, and permits a smooth sliding of the rotary disk along the sliding face formed between the upper surface of the stationary disk and the lower surface of the rotary disk without the need of a lubricant such as grease between the upper surface of the stationary disk and the lower surface of the rotary disk, and does not cause the adhesion phenomenon for a far longer period of time than before, thus providing industrially useful effects.

What is claimed is:

1. A valve of a faucet, which comprises:

a stationary disk and a rotary disk;

each of said stationary disk and said rotary disk being made of any one of a ceramics and a metal;

one surface of said stationary disk and one surface of said rotary disk being in contact with each other to form a sliding face therebetween;

at least one of said one surface of said stationary disk and said one surface of said rotary disk, which form said sliding face, having a film thereon, said film substantially comprising diamond-like carbon;

said valve of the faucet opening and closing a passage of a liquid by means of a relative displacement of said stationary disk and said rotary disk along said sliding face, to control a flow rate of said liquid; and an intermediate film containing titanium formed between said film substantially comprising said diamond-like carbon and said at least one of said one surface of said stationary disk and said one surface of said rotary disk.

2. A valve of a faucet as claimed in claim 1, wherein: said film comprising diamond-like carbon has a thickness within a range of from 0.1 to 50 $\mu$m.

3. A valve of a faucet as claimed in claim 1, wherein: said intermediate film comprises a titanium carbide (TiC) film.

4. A valve of a faucet as claimed in claim 1, wherein: said intermediate film has a double-layer structure which comprises a titanium nitride (TiN) film formed on said at least one of said one surface of said stationary disk and said one surface of said rotary disk, and a titanium carbide (TiC) film formed on said titanium nitride (TiN) film.

* * * * *